Jan. 5, 1926.  1,568,116
J. B. WEBB
SPROCKET CHAIN
Filed June 11, 1925
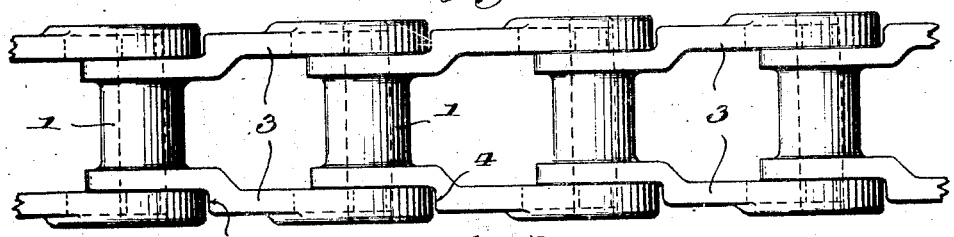
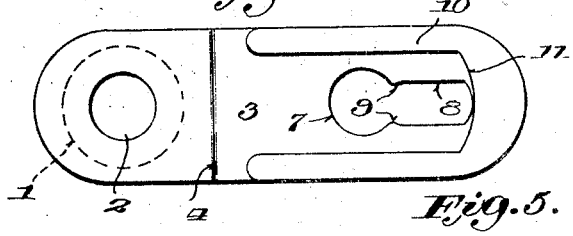
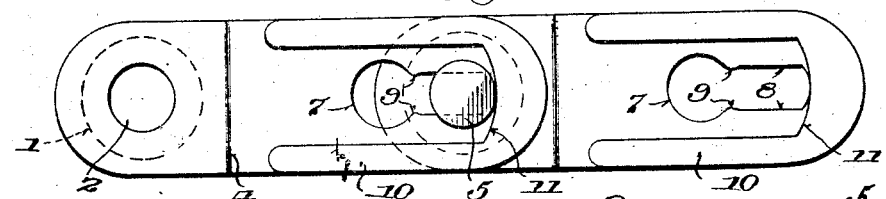
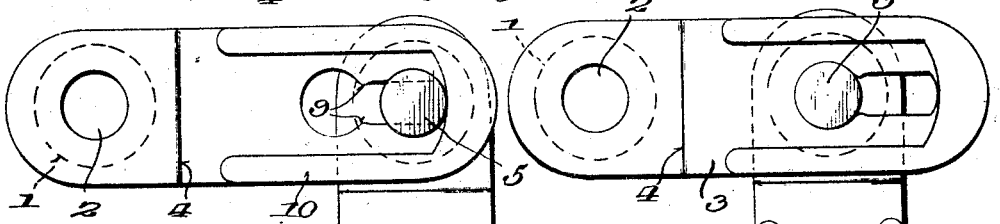
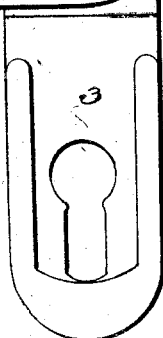
Inventor
Jervis B. Webb,
By Homer C. Underwood
Attorney Patented Jan. 5, 1926.

1,568,116

UNITED STATES PATENT OFFICE.

JERVIS B. WEBB, OF ROYAL OAK, MICHIGAN.

SPROCKET CHAIN.

Application filed June 11, 1925. Serial No. 36,348.

*To all whom it may concern:*

Be it known that I, JERVIS B. WEBB, a citizen of the United States, and resident of Royal Oak, county of Oakland, State of Michigan, have invented a new and useful Improvement in Sprocket Chains, of which the following is a specification.

The invention relates to sprocket chains of the type shown in Letters-Patent to Wallis, No. 254,739, Ewart, No. 297,362, and Tench, No. 1,377,371. In this type of sprocket chain the end of one link is provided with a tubular portion and outer shoulders adjacent the ends of the tubular portion to be interfitted with side members of an adjacent link provided wtih key-hole slots. A cylindrical locking pin is employed having segmental grooves near its ends, this pin being adapted to pass through the tubular portion of one link and the slots in the side members of the adjacent link to lock them together. The relation of parts is such that the locking pin can be passed through the slots and tubular portion only when one link is arranged at right angles to the other, and when so placed and the pin is entered, and the links are moved laterally in the direction of draught and then brought into alinement, the links will be locked together and can be separated only by the links being again returned to a position at right angles to each other.

In the use of such sprocket chains it has been found that, in assembling the links, and when the chain breaks or is removed from its working position, the pins fall out and time is wasted in their replacement.

It is one object of this invention to remedy this defect, which I accomplish, in the specific embodiment shown, by restricting the width of the key-hole slot at one point, so that the pin can be put into its working position only by the application of force, and it can be removed only by a like application.

It is also an object of this invention to provide a chain of great strength compared to its weight.

These objects are accomplished by the construction which will now be described, showing one embodiment of the invention, reference being had to the accompanying drawings in which, Fig. 1 is a plan view of a plurality of assembled links;

Fig. 2 is a side view thereof;

Fig. 3 is an enlarged side view of one of the links;

Fig. 4 is a perspective view of the locking pin;

Fig. 5 is an enlarged side view of two adjacent links showing the position of the locking pin in working position;

Fig. 6 is a side view, showing one of the links swung to a position at right angles to the other, preparatory to disconnecting them, and Fig. 7 is a similar view showing the depending link of Fig. 6 shifted laterally to the position necessary for the removal of the locking pin.

Referring to the drawings in detail, the chain is formed from a series of similar links, each having a tubular portion formed of a cylindrical member 1 having an opening 2 and side members 3 extended from its opposite ends. Each side member is provided with a shoulder 4 adjacent the tubular portion. The end of each side member has an opening in the general form of a key-hole slot. A cylindrical locking pin 5 is provided, having segmental slots 6 near its opposite ends of a width to receive the metal forming the margins of the slots. The construction so far described is old in the patents referred to above.

The key-hole slot is composed of a circular portion 7 and a substantially rectangular portion 8 extending from the circular portion towards the ends of the side members 3. At the junction of the circular and rectangular portions of the slot the metal of the wall is extended inwardly to a slight extent, as shown at 9, to form a restricted passage of a width slightly less than the distance between the bottoms of the grooves 6 of the pin 5, while the rectangular portion 8 is slightly greater in width than said distance to permit free play of the pin therein. When the pin is in working position it lies in the rectangular portion of the slot between the restricted portion and the outer end of the slot.

Extending about the slot on the margins of the free ends of the side members of the link are flanges 10, the inner end-margins 11 of which lie close to the outer ends of the slots 8, and against which the outer ends of the pins 5 bear when the chain is in working position. This flange strengthens the link and forms an extended bearing surface for the pin 5.

While I have described the best form of the invention now known to me, the invention may be embodied in other forms, and it is understood that the claims appended hereto include equivalents and modifications within the principles above disclosed.

What I claim is:

1. In a sprocket chain composed of similar links each having a tubular member and side members, said side members each having, near their free ends, elongated key-hole slots, outwardly facing shoulders on said side members near their junction with the tubular member, cylindrical pins having segmental grooves at diametrically opposite points near their ends adapted to enter the tubular member and the circular portion of the key-hole slots and lie in the rectangular portion thereof when the links are assembled, the key-hole slot being restricted at the junction of the circular and rectangular portions to a width slightly less than the distance between the bottoms of the grooves in the locking pin.

2. A sprocket link comprising a tubular member and side members projecting therefrom, each side member having an elongated key-hole slot near one end consisting of a circular portion and a rectangular portion adapted to cooperate with a cylindrical locking pin having segmental grooves near its ends, the slot being slightly restricted in width at the junction of the circular and rectangular portions, whereby the pin must be forced therethrough in passing to and from the circular and rectangular portions.

3. The combination specified in claim 1, in which the free ends of the side members of the link are provided with a marginal flange extending about the key-hole slot.

JERVIS B. WEBB.